US012006050B2

United States Patent
Aguilar Ante et al.

(10) Patent No.: US 12,006,050 B2
(45) Date of Patent: Jun. 11, 2024

(54) SYSTEMS AND METHODS FOR LATCH HOOK LENGTH ADJUSTMENT

(71) Applicant: ROHR, INC., Chula Vista, CA (US)

(72) Inventors: Jose Roberto Aguilar Ante, Mexicali (MX); David Louis Lipson, Chula Vista, CA (US); Jaime Francisco Salazar Ibarra, Mexicali (MX)

(73) Assignee: ROHR, INC., Chula Vista, CA (US)

( * ) Notice: Subject to any disclaimer, the term of this patent is extended or adjusted under 35 U.S.C. 154(b) by 222 days.

(21) Appl. No.: 17/220,571

(22) Filed: Apr. 1, 2021

(65) Prior Publication Data

US 2021/0347494 A1 Nov. 11, 2021

Related U.S. Application Data

(60) Provisional application No. 63/020,392, filed on May 5, 2020.

(51) Int. Cl.
*B64D 29/06* (2006.01)
*E05B 63/06* (2006.01)
*E05C 19/14* (2006.01)

(52) U.S. Cl.
CPC .............. *B64D 29/06* (2013.01); *E05B 63/06* (2013.01); *E05C 19/145* (2013.01); *E05Y 2900/502* (2013.01)

(58) Field of Classification Search
CPC .... E05C 19/14; E05C 19/145; E05B 15/0086; E05B 65/0817; E05B 63/06; Y10S 292/49; Y10S 292/60; Y10T 292/0911; Y10T 292/216
See application file for complete search history.

(56) References Cited

U.S. PATENT DOCUMENTS

| | | | |
|---|---|---|---|
| 4,320,912 A | 3/1982 | Grace et al. | |
| 4,421,349 A | 12/1983 | Greiert, Jr. | |
| 5,076,514 A | 12/1991 | Melcher | |
| 5,984,382 A | 11/1999 | Bourne et al. | |
| 8,864,189 B2 | 10/2014 | Fournie et al. | |
| 2009/0173823 A1 | 7/2009 | Shetzer | |
| 2015/0300061 A1 | 10/2015 | Fabre | |
| 2016/0264250 A1* | 9/2016 | Hernandez | B64D 29/06 |
| 2017/0260782 A1* | 9/2017 | Kim | E05B 13/002 |

OTHER PUBLICATIONS

European Patent Office, European Search Report dated Oct. 1, 2021 in Application No. 21172262.4.
European Patent Office, European Office Action dated Mar. 17, 2023 in Application No. 21172262.4.

* cited by examiner

*Primary Examiner* — Christine M Mills
*Assistant Examiner* — Yahya Sidky
(74) *Attorney, Agent, or Firm* — SNELL & WILMER L.L.P.

(57) ABSTRACT

A latch hook length adjustment arrangement includes a latch hook body comprising a hook and a rod extending from the hook, an adjustment nut configured to threadingly couple to the rod, a plurality of detent pockets disposed in the first side surface of the adjustment nut, a bearing sleeve comprising one or more bearings, and a spring member configured to bias the adjustment nut against the bearing sleeve. The detent pockets and bearing(s) may retain the nut in a rotational position, thereby maintaining the positional length of the hook.

20 Claims, 5 Drawing Sheets

SYSTEMS AND METHODS FOR LATCH HOOK LENGTH ADJUSTMENT

CROSS REFERENCE TO RELATED APPLICATIONS

This application claims priority to and the benefit of U.S. Patent Application No. 63/020,392 filed May 5, 2020 and entitled "SYSTEMS AND METHODS FOR LATCH HOOK LENGTH ADJUSTMENT," which is hereby incorporated by reference in its entirety for all purposes.

FIELD

The present disclosure relates generally to latch handle assemblies capable of being used in an aircraft and, more particularly, to adjustable latch hooks for latch handle assemblies.

BACKGROUND

Latch handles are commonly used in the nacelle of an aircraft, for example, in fan cowls. Fan cowls are hinged to the pylon or to a frame structure attached at the top of the nacelle. Fan cowls enclose the engine fan case and are typically latched with three latches at the bottom of the nacelle. Latch handles secure the fan cowl during flight. Various nacelle components may comprise variations in build tolerances.

SUMMARY

A latch hook length adjustment arrangement is disclosed, comprising, a latch hook frame comprising a first wall and a second wall, a first rod aperture disposed in the first wall of the latch hook frame, a second rod aperture disposed in the second wall of the latch hook frame, a latch hook body comprising a hook and a rod extending from the hook, wherein the first rod aperture is configured to receive the rod and the second rod aperture is configured to receive the rod, an adjustment nut comprising a first side surface, a second side surface disposed opposite the adjustment nut from the first side surface, and a radially outer surface, wherein the adjustment nut is threadingly coupled to the rod, a plurality of detent pockets disposed in the first side surface of the adjustment nut, a bearing sleeve comprising a hollow sleeve portion surrounding the rod, a flange extending radially outward from the hollow sleeve portion, and a bearing disposed in the flange, a spring member configured to bias the adjustment nut against the bearing sleeve, the spring member is disposed opposite the adjustment nut from the bearing sleeve, and the spring member is disposed between the second wall and the adjustment nut. In response to rotation of the adjustment nut in a first rotational direction with respect to the rod, the rod is configured to extend from the first rod aperture. In response to rotation of the adjustment nut in a second rotational direction with respect to the rod, the rod is configured to retract into the first rod aperture.

In various embodiments, the latch hook length adjustment arrangement further comprises an access aperture disposed in the latch hook frame, wherein the adjustment nut is accessible via the access aperture.

In various embodiments, the first rod aperture is aligned with the second rod aperture.

In various embodiments, the latch hook length adjustment arrangement further comprises a plurality of adjustment pockets disposed in the radially outer surface of the adjustment nut.

In various embodiments, an inner diameter of the adjustment nut is less than an inner diameter of the bearing sleeve.

A latch hook length adjustment arrangement is disclosed, comprising a latch hook frame, a first rod aperture disposed in the latch hook frame, a latch hook body comprising a hook and a rod extending from the hook, wherein the first rod aperture is configured to receive the rod, an adjustment nut configured to receive the rod, wherein the adjustment nut comprises a plurality of detent pockets disposed in a first side surface of the adjustment nut, a bearing sleeve configured to engage the adjustment nut, wherein the bearing sleeve comprises a bearing, and the plurality of detent pockets are configured to receive the bearing to secure the adjustment nut at a rotational position with respect to the rod, and a spring member configured to bias the adjustment nut against the bearing sleeve. In response to rotation of the adjustment nut in a first rotational direction with respect to the rod, the rod is configured to extend from the first rod aperture. In response to rotation of the adjustment nut in a second rotational direction with respect to the rod, the rod is configured to retract into the first rod aperture.

In various embodiments, the bearing sleeve is configured to receive the rod.

In various embodiments, the spring member is configured to receive the rod.

In various embodiments, the latch hook length adjustment arrangement further comprises a plurality of adjustment pockets disposed in a radially outer surface of the adjustment nut.

In various embodiments, the plurality of adjustment pockets are configured to receive a tool for rotating the adjustment nut.

In various embodiments, the adjustment nut comprises a second side surface disposed opposite the adjustment nut from the first side surface, and the second side surface is substantially smooth.

In various embodiments, the spring member engages the second side surface.

In various embodiments, the spring member comprises a wave spring.

In various embodiments, each detent pocket of the plurality of detent pockets is disposed at an equal distance from an axis of rotation of the adjustment nut.

In various embodiments, the latch hook length adjustment arrangement further comprises a second rod aperture disposed in the latch hook frame, wherein the second rod aperture is aligned with the first rod aperture, and the second rod aperture is configured to receive the rod, wherein the adjustment nut, the bearing sleeve, and the spring member are disposed between the first rod aperture and the second rod aperture.

A latch hook length adjustment arrangement is disclosed, comprising a latch hook body comprising a hook and a rod extending from the hook, an adjustment nut comprising a first side surface, a second side surface disposed opposite the adjustment nut from the first side surface, and a radially outer surface, wherein the adjustment nut is configured to threadingly couple to the rod, a plurality of detent pockets disposed in the first side surface of the adjustment nut, a bearing sleeve comprising a hollow sleeve portion, a flange extending radially outward from the hollow sleeve portion, and a bearing disposed in the flange, and a spring member configured to bias the adjustment nut against the bearing sleeve.

In various embodiments, in response to rotation of the adjustment nut in a first rotational direction with respect to the rod, the rod is configured to move axially with respect to the adjustment nut in a first linear direction.

In various embodiments, in response to rotation of the adjustment nut in a second rotational direction with respect to the rod, the rod is configured to move axially with respect to the adjustment nut in a second linear direction.

In various embodiments, the second side surface of the adjustment nut is substantially smooth.

In various embodiments, each detent pocket of the plurality of detent pockets is sized corresponding to a geometry of the bearing.

The foregoing features, elements, steps, or methods may be combined in various combinations without exclusivity, unless expressly indicated herein otherwise. These features, elements, steps, or methods as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the disclosure, it should be understood that other embodiments may be realized and that logical, material, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to "without contact" (or similar phrases) may also include reduced contact or minimal contact.

As used herein, "outward" may define an element or portion of an element that is situated radially outer to or away from another, radially inward, element or portion of an element. Thus, an engine core may be situated radially inward of a fan casing, as described herein. As used herein, "inward" may define the element or portion of the element that is situated radially inward in relation to an outward element.

Aircraft fan cowls are often held together with latch assemblies along various axial distances along the fan case. Fan cases may be encased by two fan cowls, which may be joined together with a latch mechanism (e.g., at the bottom of the fan cowls). For example, a fan cowl may include a latch assembly at the bottom of the fan cowl to allow the fan cowl to be hinged open to facilitate access to various fan case components. Due to build tolerance of the nacelle, it may be desirable to make a latch assembly to be adjustable to fit each individual nacelle and to adjust for geometrical changes of the nacelle over time.

A latch hook length adjustment arrangement of the present disclosure provides convenient and readily accessible adjustment of a length of the latch hook. A latch hook length adjustment arrangement of the present disclosure may provide for adjustment of a length of the latch hook using an existing and common tool.

Figure 1:
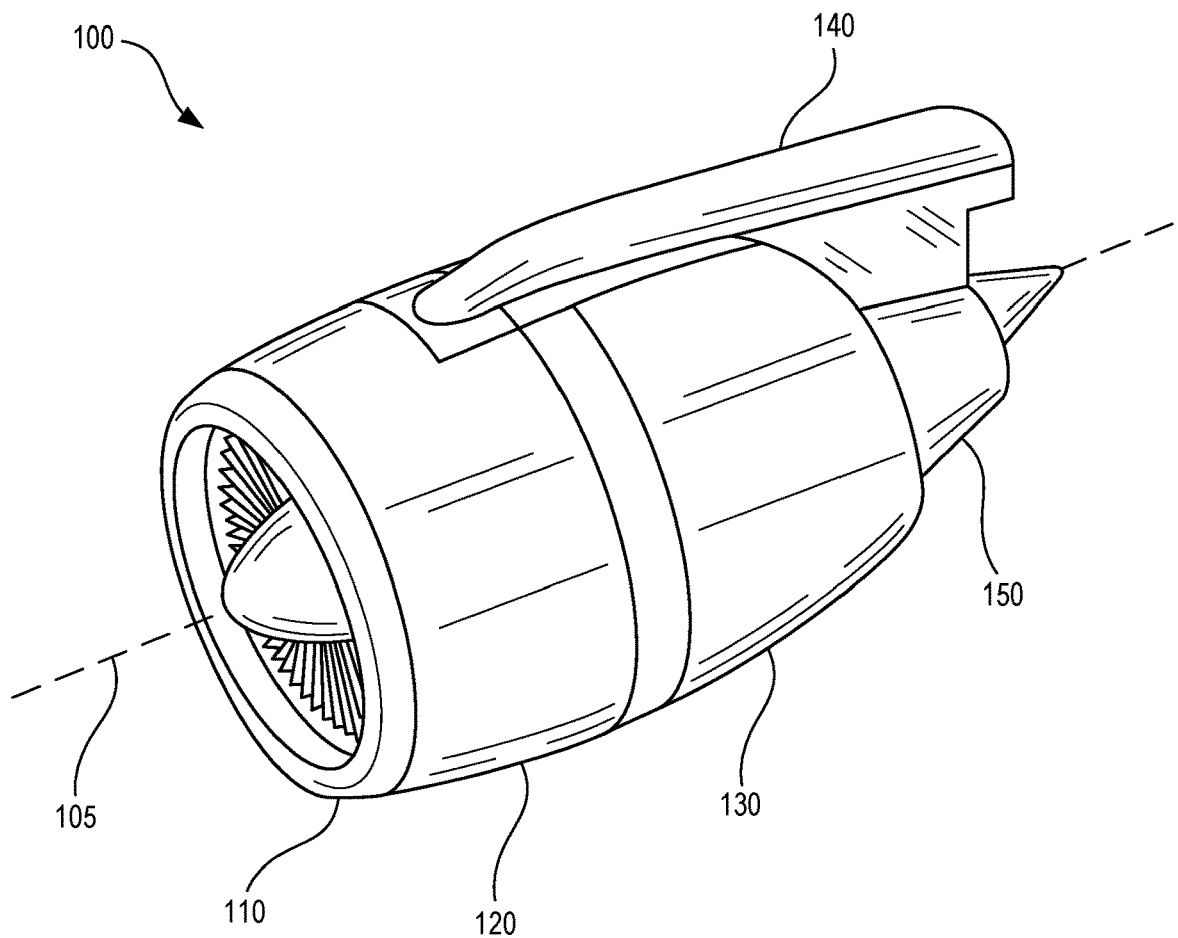
FIG. 1 illustrates a perspective view of a nacelle for an aircraft in accordance with various embodiments.

Referring to FIG. 1, a nacelle 100 for a gas turbine engine is illustrated according to various embodiments. Nacelle 100 may comprise an inlet 110, a fan cowl 120, and a thrust reverser 130. Nacelle 100 may be coupled to a pylon 140, which may mount the nacelle 100 to an aircraft wing or aircraft body. Nacelle 100 may further comprise an exhaust nozzle 150. Nacelle 100 surrounds the engine providing smooth aerodynamic surfaces for airflow around and into the engine. Fan cowl 120 typically comprises two halves. One half may be referred to as a first fan cowl and the other half may be referred to as a second fan cowl. The first fan cowl and second fan cowl are typically hinged to the pylon or to a frame structure attached at the top of nacelle 100. The nacelle 100 may be disposed about a centerline 105, which may also be the axis of rotation of an engine located within the nacelle 100.

Figure 2:
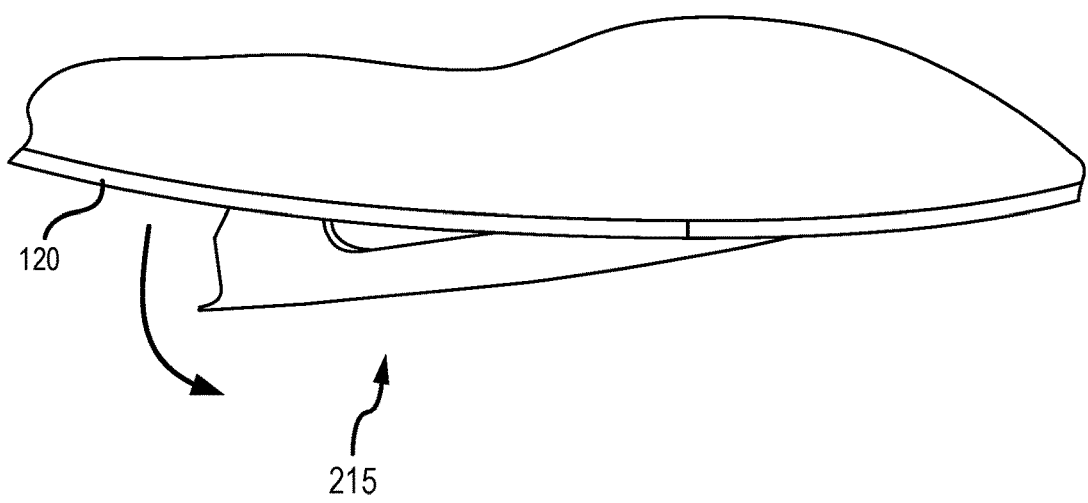
FIG. 2 illustrates a perspective view of a portion of a nacelle for an aircraft with a latch handle rotated towards an open position, in accordance with various embodiments.

With reference to FIG. 2, and with continuing reference to FIG. 1, a front view of a portion of an engine nacelle with a fan cowl latch handle rotated towards an open position is provided. According to various embodiments, latch handle 215 may be included at the bottom of nacelle 100. Latch assemblies typically comprise a latch hook and a latch keeper, wherein the latch hook is actuated by a latch handle located on a flow surface (e.g., an outward portion of the nacelle). Accordingly, in response to the handle being operated, the latch keeper disengages from the latch hook, allowing access to the oil tank, full authority digital engine control (FADEC) box, and other fan case components.

Figure 3:
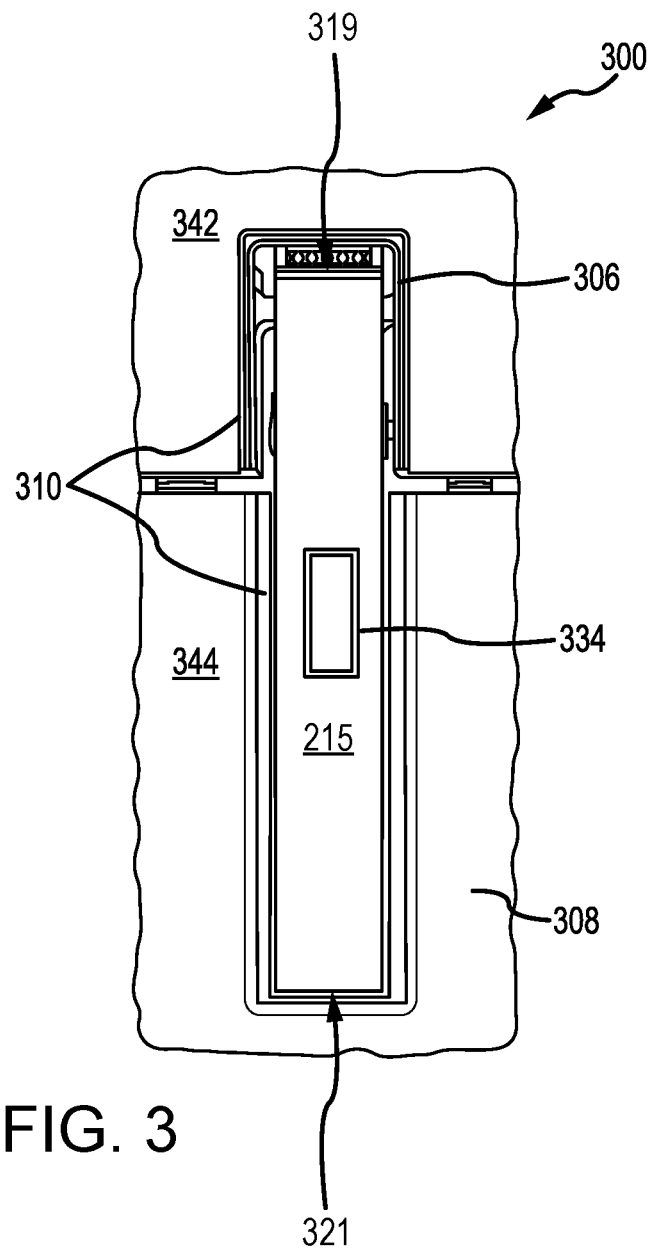
FIG. 3 illustrates an outward view of a latch handle assembly on a nacelle, wherein the latch handle assembly comprises a latch handle comprising a notification feature, in accordance with various embodiments.

With reference to FIG. 3, an outward view of a latch handle assembly 300 on a nacelle is provided. According to various embodiments, latch handle assembly 300 may include latch housing 310 and latch handle 215. Latch housing 310 may include a first half 306 and a second half 308. First half 306 of latch housing 310 may be referred to as a keeper housing. First half 306 of latch housing 310 may be attached to a first cowl 342 according to various embodiments. Second half 308 of latch housing 310 may be attached to a second cowl 344 according to various embodiments. According to various embodiments, first cowl 342 may be a first fan cowl. According to various embodiments, second cowl 344 may be a second fan cowl.

According to various embodiments, latch handle 215 may include a first end 319 and a second end 321. First end 319 may be rotatable coupled to first half 306 of latch housing 310. In this regard, second end 321 may rotate away from second cowl 344 in response to latch handle 215 rotating to an open position. According to various embodiments, latch housing 310 may be configured to enclose at least a portion of latch handle 215 such that the outward surface of latch housing 310 and the outward surface of latch handle 215 are substantially flush relative to each other when in the closed position. In this manner, latch handle assembly 300 may be aerodynamically efficient.

According to various embodiments, latch handle 215 may include aperture 334. Aperture 334 may be disposed on latch handle 215 in order to facilitate the opening of latch handle 215. Typically, the opening of latch handle 215 from the closed position is facilitated by inserting an object into aperture 334 to depress a release member which may partially release latch handle 215 from latch housing 310. The latch handle 215 may then be further opened by prying latch handle 215 open. However, latch handle arrangements of the present disclosure may be configured to be opened via any suitable method without departing from the scope of the present disclosure.

Figure 4:
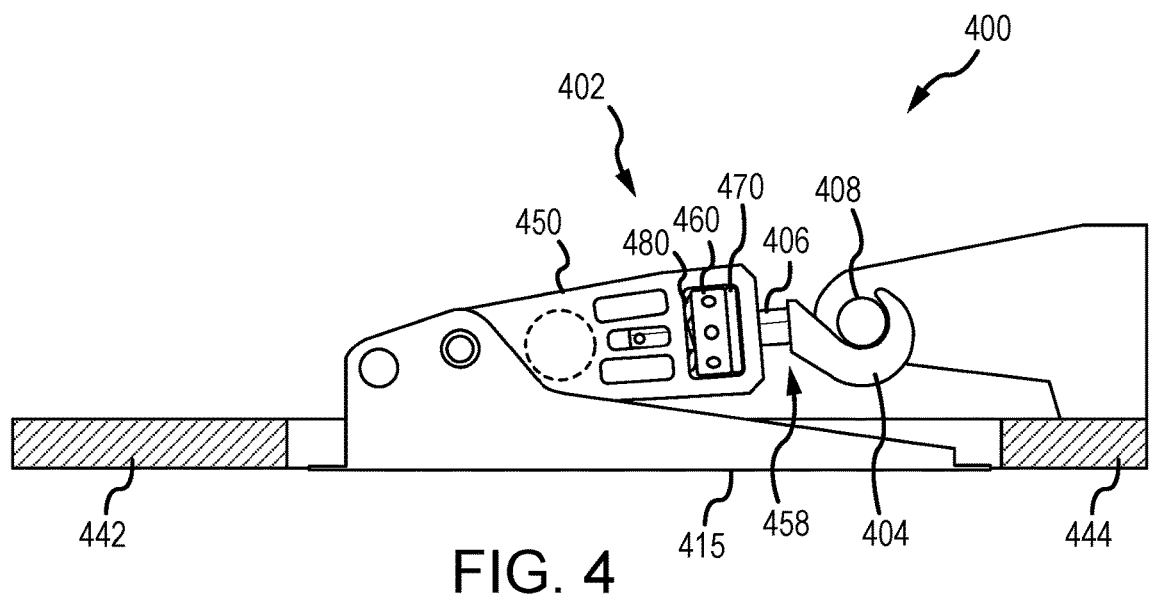
FIG. 4 illustrates a nacelle latch assembly comprising a latch hook length adjustment arrangement, in accordance with various embodiments.
Figure 5:
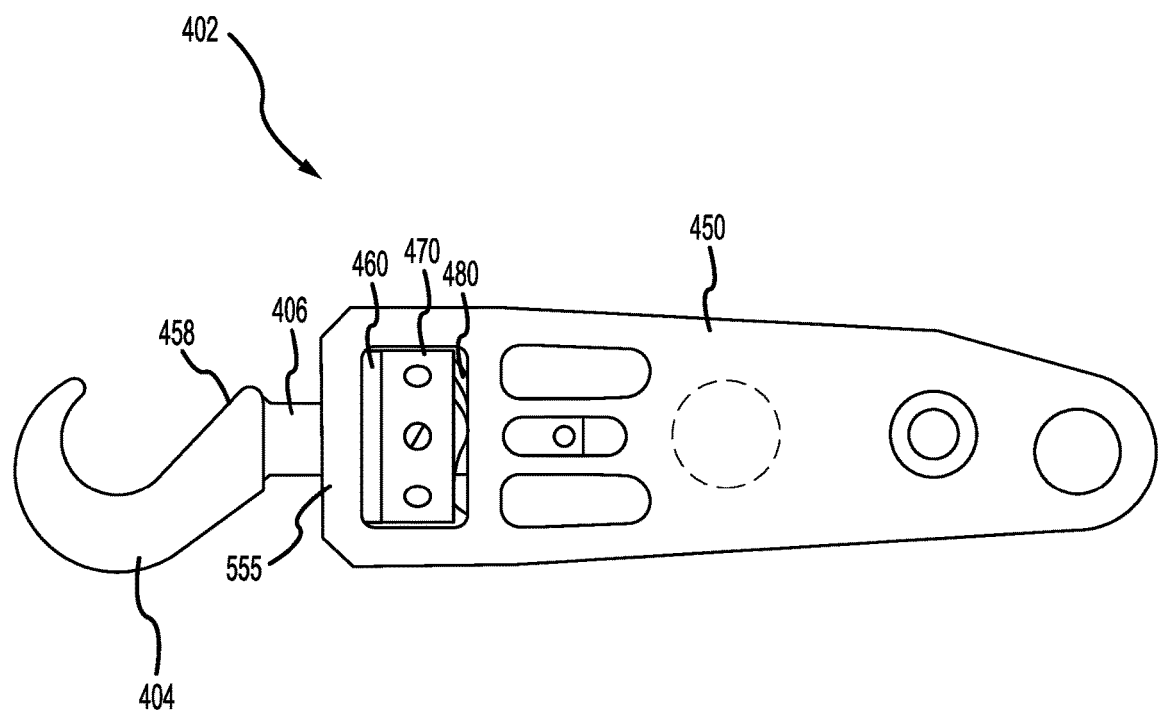
FIG. 5 illustrates the latch hook length adjustment arrangement of FIG. 4, in accordance with various embodiments.

With reference to FIG. 4, a latch assembly 400 comprising a latch hook length adjustment arrangement 402 is illustrated, in accordance with various embodiments. Latch assembly 400 generally comprises a latch hook 404 and a latch keeper 408, wherein the latch hook 404 is actuated by a latch handle 415 located on a flow surface (e.g., an outward portion of a nacelle). With the latch hook 404 engaged with the latch keeper 408, first panel 442 and second panel 444 may be secured in a closed position. Accordingly, in response to latch handle 415 being operated, the latch keeper 408 disengages from the latch hook 404, allowing access to within first panel 442 and second panel 444.

Latch hook length adjustment arrangement 402 generally comprises a frame 450 (also referred to herein as a latch hook frame), a latch hook body 458, a nut 460 (also referred to herein as an adjustment nut), a sleeve 470 (also referred to herein as a bearing sleeve), and a spring member 480. Frame 450 may be pivotally coupled to latch handle 415. Frame 450 may be made from metal. Frame 450 may provide a load path between handle 415 and latch hook body 458. Latch hook body 458 generally comprises hook 404 and a rod 406 extending from the hook 404. Hook 404 may engage with keeper 408. Rod 406 may be received into frame 450. The relative position or extension of latch hook body 458 may be selectively adjusted by rotating nut 460 with respect to rod 406.

Figure 6:
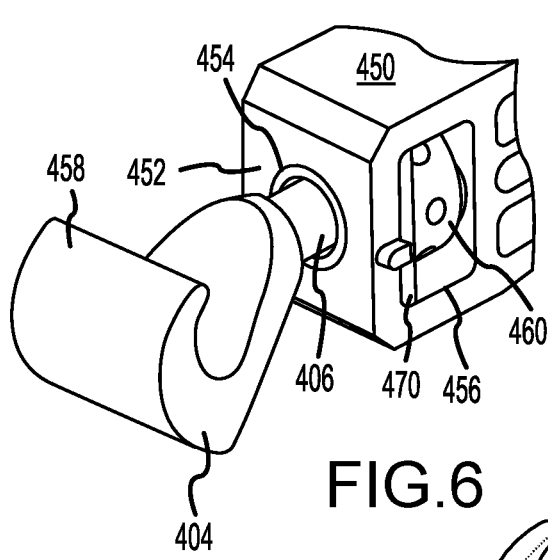
FIG. 6 illustrates a latch hook body extending from a frame of the latch hook length adjustment arrangement of FIG. 4, in accordance with various embodiments.

With reference to FIG. 6, frame 450 may comprise a wall 452. Wall 452 may be an end wall (i.e., disposed at an end of frame 450). An aperture 454 (also referred to herein as a first rod aperture) may be disposed in wall 452. Aperture 454 may be configured to receive rod 406 of latch hook body 458. An aperture 456 (also referred to herein as an access aperture) may be disposed in frame 450. Aperture 456 may extend completely through frame 450 or may extend partially through frame 450 to form a cavity. Aperture 456 may provide clearance for installing nut 560, sleeve 470, and spring member 480 into frame 450. Furthermore, aperture 456 may provide access for rotating nut 460 with respect to rod 406 to adjust a total length of latch hook length adjustment arrangement 402.

Figure 7:
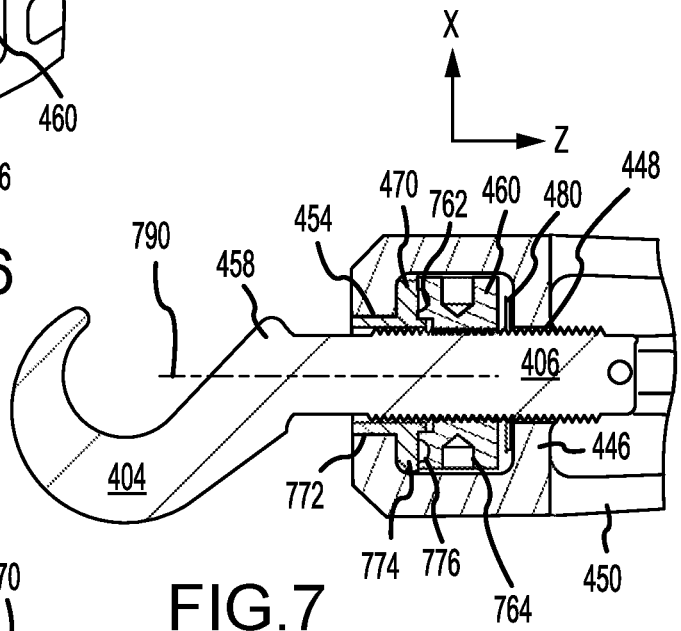
FIG. 7 illustrates a section view of the latch hook length adjustment arrangement of FIG. 4, in accordance with various embodiments.

With reference to FIG. 7, a cross-section view of latch hook length adjustment arrangement 402 is illustrated, in accordance with various embodiments. In various embodiments, rod 406 is received by sleeve 470. In various embodiments, rod 406 is received by nut 460. In various embodiments, rod 406 is received by spring member 480. Sleeve 470 may comprise a hollow cylindrical sleeve portion 772 and a flange 774 radially extending from the hollow cylindrical sleeve portion 772. Flange 774 may comprise a rectangular or other geometry such that flange 774 abuts frame 450 to prevent rotation of sleeve 470 with respect to frame 450.

Figure 8:
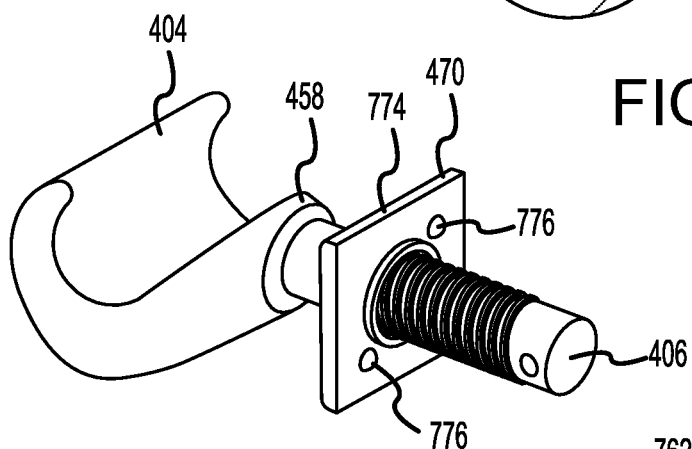
FIG. 8 illustrates the latch hook body and a sleeve comprising bearings disposed over a rod of the latch hook body of the latch hook length adjustment arrangement of FIG. 4, in accordance with various embodiments.
Figure 9:
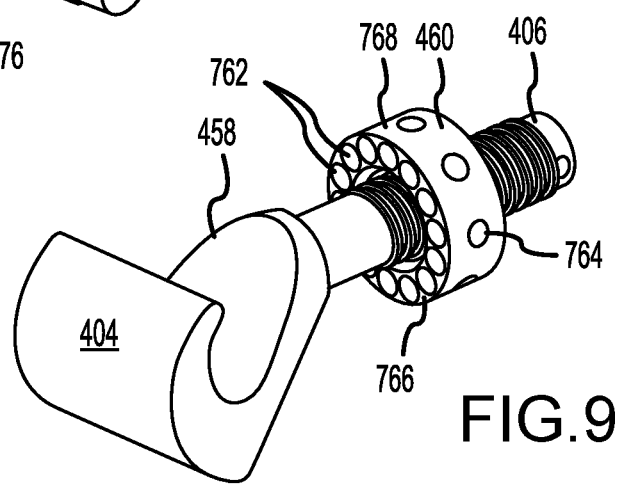
FIG. 9 illustrates the latch hook body and a nut comprising detent pockets disposed over the rod of the latch hook body of the latch hook length adjustment arrangement of FIG. 4, in accordance with various embodiments.
Figure 10:
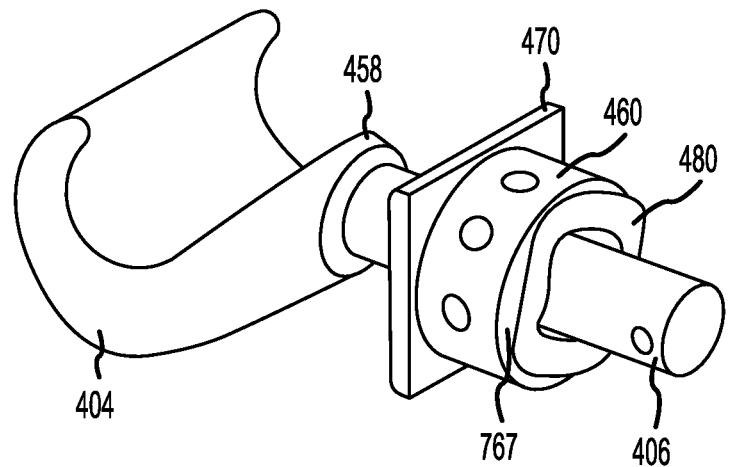
FIG. 10 illustrates the latch hook length adjustment arrangement of FIG. 4 with the frame omitted for clarity purposes, and a spring member of the latch hook length adjustment arrangement engaged with a side surface of the nut, in accordance with various embodiments.

With combined reference to FIG. 7, FIG. 8, and FIG. 9, flange 774 may comprise one or more bearings 776 coupled thereto that extend towards nut 460. In various embodiments, bearings 776 comprise ball bearings. Nut 460 may comprise a plurality of detent pockets 762 circumferentially disposed in a side surface 766 (also referred to herein as a first side surface) of nut 460. Stated differently, each detent pocket 762 may be positioned at an equal distance away from axis 790. Axis 790 may comprise a centerline axis of rod 406. Axis 790 may comprise an axis of rotation of nut 460. The bearing(s) 776 may be received by detent pockets 762 to mechanically retain nut 460 at a rotational position with respect to rod 406 (i.e., to prevent nut 460 from rotating about axis 790 with respect to rod 406). In this regard, each detent pocket 762 may be sized corresponding to a geometry of the bearing(s) 776). To rotate nut 460, a tool may be inserted into one of a plurality of adjustment pockets 764 disposed in a radially outer surface 768 of nut 460 to exert a torsional force on nut 460. In response to the torsional force, the bias of spring member 480, allowing nut 460 to move axially towards spring member 480 such that the bearing(s) 776 exit the associated detent pocket 762 as the nut 460 rotates about axis 790. The force exerted between spring member 480 and nut 460 may be parallel to axis 790. The bearing(s) 776 may be received by the next adjacent detent pocket 762 as the nut 460 rotates about axis 790 until the torsional force is no longer applied, wherein the ball bearing(s) 776 are received by an associated detent pocket 762 to prevent nut 460 from freely rotating. In this regard, spring member 480 may bias nut 460 towards and against sleeve 470. In various embodiments, spring member 480 comprises a wave spring. However, any suitable style of spring may be used without departing from the scope of the present disclosure. For example, spring member 480 may comprise one or more coil springs, a slotted disk spring, a finger spring, a curved spring, etc. With additional reference to FIG. 10, spring member 480 may engage a side surface 767 (also referred to herein as a second side surface) of nut 460. Side surface 767 may be disposed opposite nut 460 from side surface 766.

In various embodiments, the inner diameter surface of nut 460 comprises threads. Similarly, the outer diameter surface of rod 406 may comprise threads. In this regard, nut 460 may be threadingly coupled to rod 406. As nut 460 rotates about axis 790, the axial position of nut 460 remains substantially constant, with respect to frame 450. Thus, as nut 460 rotates about axis 790, the threaded coupling converts rotational motion of nut 460 into linear motion of rod 406. In contrast to the inner diameter surface of nut 460, the inner diameter surface of sleeve 470 may be generally smooth to allow rod 406 to freely translate therethrough. Furthermore, the inner diameter of sleeve 470 may be greater than the outer diameter of rod 406, allowing clearance between sleeve 470 and rod 406 to prevent rod 406 from catching or binding on sleeve 470. Thus, the inner diameter of nut 460 may be less than the inner diameter of sleeve 470. In this manner, rod 406 may be configured to extend from aperture 454 of frame 450 in response to rotation of nut 460 in a first rotational direction with respect to rod 406. Conversely, rod 406 may be configured to retract into aperture 454 of frame 450 in response to rotation of nut 460 in a second (opposite) rotational direction with respect to rod 406. Stated differently, in response to rotation of nut 460 about axis 790 in the first rotational direction with respect to rod 406, the rod 406 may be configured to move axially with respect to nut 460 in a first linear direction (i.e., in the negative Z-direction), and in response to rotation of nut 460 about axis 790 in the second rotational direction with respect to rod 406, rod 406 may be configured to move axially with respect to nut 460 in a second linear direction (i.e., in the positive Z-direction).

With combined reference to FIG. 6 and FIG. 7, to install latch hook body 458 to frame 450, sleeve 470 may be inserted into aperture 456 (e.g., in the negative Y-direction). Hollow cylindrical sleeve portion 772 of sleeve 470 may be moved into aperture 454 (e.g., in the negative Z-direction), thereby aligning aperture 454 and sleeve 470. Nut 460 may be moved into aperture 456 (e.g., in the negative Y-direction). Spring member 480 may be moved into aperture 456 (e.g., in the negative Y-direction). Nut 460 may be aligned with aperture 454. Spring member 480 may be aligned with aperture 454. Rod 406 may be inserted into aperture 454 and hollow cylindrical sleeve portion 772 (e.g., along the positive Z-direction). Rod 406 may be moved in the positive Z-direction and received by nut 460. Rod 406 and/or nut 460 may be threadingly coupled. In this regard, rod 406 and/or nut 460 may be rotated to drive rod 406 in the positive Z-direction. As rod 406 is driven in the positive Z-direction, spring member 480 may receive rod 406. Frame 450 may comprise a second wall 446. An aperture 448 (also referred to herein as a second rod aperture) may be disposed in second wall 446. Aperture 448 may be aligned with aperture 454. Rod 406 may be further received by aperture 448. In this installed position, rod 406 may retain nut 460, sleeve 470, and spring member 480 within aperture 456 of frame 450. Furthermore, nut 460 may retain rod 406 of latch hook body 458 to frame 450.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosed embodiments. The scope of the claimed embodiments is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to invoke 35 U.S.C. § 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

We claim:

1. A latch hook length adjustment arrangement comprising:
   a latch hook frame comprising a first wall and a second wall;
   a first rod aperture disposed in the first wall of the latch hook frame;
   a second rod aperture disposed in the second wall of the latch hook frame;
   a latch hook body comprising a hook and a rod extending from the hook, wherein the first rod aperture is configured to receive the rod and the second rod aperture is configured to receive the rod;
   an adjustment nut comprising a first side surface, a second side surface disposed opposite the adjustment nut from the first side surface, and a radially outer surface, wherein the adjustment nut is threadingly coupled to the rod;
   a plurality of detent pockets disposed in the first side surface of the adjustment nut;

a bearing sleeve comprising a hollow sleeve portion surrounding the rod, a flange extending radially outward from the hollow sleeve portion, and a bearing disposed at least partially in the flange, the first rod aperture configured to receive at least a portion of the hollow sleeve portion;

a spring member configured to bias the adjustment nut against the bearing sleeve, the spring member is disposed opposite the adjustment nut from the bearing sleeve, and the spring member is disposed between the second wall and the adjustment nut;

wherein, in response to rotation of the adjustment nut in a first rotational direction with respect to the rod, the rod is configured to extend from the first rod aperture, and in response to rotation of the adjustment nut in a second rotational direction with respect to the rod, the rod is configured to retract into the first rod aperture.

2. The latch hook length adjustment arrangement of claim 1, further comprising an access aperture disposed in the latch hook frame, wherein the adjustment nut is accessible via the access aperture.

3. The latch hook length adjustment arrangement of claim 1, wherein the first rod aperture is aligned with the second rod aperture.

4. The latch hook length adjustment arrangement of claim 1, further comprising a plurality of adjustment pockets disposed in the radially outer surface of the adjustment nut.

5. The latch hook length adjustment arrangement of claim 1, wherein an inner diameter of the adjustment nut is less than an inner diameter of the bearing sleeve.

6. A latch hook length adjustment arrangement comprising:
   a latch hook frame;
   a first rod aperture disposed in the latch hook frame;
   a latch hook body comprising a hook and a rod extending from the hook, wherein the first rod aperture is configured to receive the rod;
   an adjustment nut configured to receive the rod, wherein the adjustment nut comprises a plurality of detent pockets disposed in a first side surface of the adjustment nut;
   a bearing sleeve configured to engage the adjustment nut, the bearing sleeve comprises a hollow sleeve portion surrounding the rod, a flange extending outward from the hollow sleeve portion, and a bearing coupled to the flange, the plurality of detent pockets are configured to receive the bearing to secure the adjustment nut at a rotational position with respect to the rod, and the first rod aperture is configured to receive at least a portion of the hollow sleeve portion; and
   a spring member configured to bias the adjustment nut against the bearing sleeve,
   wherein, in response to rotation of the adjustment nut in a first rotational direction with respect to the rod, the rod is configured to extend from the first rod aperture, and
   in response to rotation of the adjustment nut in a second rotational direction with respect to the rod, the rod is configured to retract into the first rod aperture.

7. The latch hook length adjustment arrangement of claim 6, wherein the bearing sleeve is configured to receive the rod.

8. The latch hook length adjustment arrangement of claim 6, wherein the spring member is configured to receive the rod.

9. The latch hook length adjustment arrangement of claim 6, further comprising a plurality of adjustment pockets disposed in a radially outer surface of the adjustment nut.

10. The latch hook length adjustment arrangement of claim 9, wherein the plurality of adjustment pockets are configured to receive a tool for rotating the adjustment nut.

11. The latch hook length adjustment arrangement of claim 6, wherein the adjustment nut comprises a second side surface disposed opposite the adjustment nut from the first side surface, and the second side surface is substantially smooth.

12. The latch hook length adjustment arrangement of claim 11, wherein the spring member engages the second side surface.

13. The latch hook length adjustment arrangement of claim 6, wherein the spring member comprises a wave spring.

14. The latch hook length adjustment arrangement of claim 6, wherein each detent pocket of the plurality of detent pockets is disposed at an equal distance from an axis of rotation of the adjustment nut.

15. The latch hook length adjustment arrangement of claim 6, further comprising a second rod aperture disposed in the latch hook frame, wherein the second rod aperture is aligned with the first rod aperture, and the second rod aperture is configured to receive the rod, wherein the adjustment nut, the bearing sleeve, and the spring member are disposed between the first rod aperture and the second rod aperture.

16. A latch hook length adjustment arrangement, comprising:
   a latch hook body comprising a hook and a rod extending from the hook, the rod comprising a centerline axis;
   an adjustment nut comprising a first side surface, a second side surface disposed opposite the adjustment nut from the first side surface, and a radially outer surface, wherein the adjustment nut is configured to threadingly couple to the rod;
   a plurality of detent pockets disposed in the first side surface of the adjustment nut;
   a bearing sleeve comprising a flange and a hollow sleeve portion, the hollow sleeve portion surrounding the rod, protruding axially from the flange, and comprising a cylindrical geometry, the flange extending radially outward from the hollow sleeve portion;
   a bearing disposed at least partially in the flange; and
   a spring member configured to bias the adjustment nut against the bearing sleeve.

17. The latch hook length adjustment arrangement of claim 16, wherein, in response to rotation of the adjustment nut in a first rotational direction with respect to the rod, the rod is configured to move axially with respect to the adjustment nut in a first linear direction.

18. The latch hook length adjustment arrangement of claim 17, wherein, in response to rotation of the adjustment nut in a second rotational direction with respect to the rod, the rod is configured to move axially with respect to the adjustment nut in a second linear direction.

19. The latch hook length adjustment arrangement of claim 16, wherein the second side surface of the adjustment nut is substantially smooth.

20. The latch hook length adjustment arrangement of claim 16, wherein each detent pocket of the plurality of detent pockets is sized corresponding to a geometry of the bearing.

* * * * *